June 22, 1943.   C. H. WHITE   2,322,332
PLANTER
Filed July 8, 1940   4 Sheets-Sheet 1

INVENTOR:
CHARLES H. WHITE
BY
ATTORNEYS.

June 22, 1943.  C. H. WHITE  2,322,332
PLANTER
Filed July 8, 1940  4 Sheets-Sheet 4

INVENTOR:
CHARLES H. WHITE
BY
ATTORNEYS.

Patented June 22, 1943

2,322,332

UNITED STATES PATENT OFFICE 2,322,332

PLANTER

Charles H. White, Moline, Ill., assignor to Deere & Company, Moline, Ill., a corporation of Illinois Application July 8, 1940, Serial No. 344,310

12 Claims. (Cl. 97—47)

The present invention relates generally to agricultural machines and is more particularly concerned with a planting implement of the so-called integral type, wherein the tractor serves as the supporting frame for the furrow openers and associated parts.

The object and general nature of the present invention is the provision of an agricultural machine especially adapted to be connected to a tractor and embodying a cross shaft to which a pair of draft frames are connected at their forward ends, the draft frames connected at their rear ends to the rear axle housing of the tractor. This provides an exceptionally strong and sturdy frame construction which adequately sustains the stresses encountered when operating in difficult soil conditions.

Another feature of this invention is the provision of a planter of the integral type, embodying generally vertically shiftable tool beams which are guided by a sector and one or more rollers associated therewith, with means whereby the roller or rollers may be adjusted to determine the proper position of each tool beam and the sector is arranged to take load reactions. A further feature of this invention is the provision of means whereby the sector and rollers determine the lateral position of the tool beam and may be adjusted to secure various row spacings.

Another feature of the present invention is the provision of means for raising and lowering each tool beam with which is associated spring yielding means permitting the depth adjusting part to be moved into the desired position and stressing the spring means so that the latter acts when the implement moves forwardly to force the tool or tools down into the position determined by the depth adjusting part.

A further feature of this invention is the provision of a rigid draft frame construction which comprises a cross bar fixed to the tractor and a pair of draft frames fixed to the cross bar and to the rear axle housing, in connection with separate means for supporting the planting and/or fertilizer distributing units on the tractor, each draft frame adjustably carrying planter and fertilizer furrow openers.

Still further, another feature of this invention is the provision of means whereby a covering frame may be floatingly connected with the tool beam but lifted with the latter when the tool beam is raised into inoperative position.

These and other objects and advantages of the present invention will be apparent to those skilled in the art after a consideration of the following detailed description of the preferred structural embodiment, taken in conjunction with the accompanying drawings in which the preferred structural embodiment has been illustrated.

In the drawings:

Figure 2 is a perspective view, taken on an enlarged scale, of the left-hand tool beam, draft frame and associated parts, with the fertilizer unit omitted;

Figure 1:
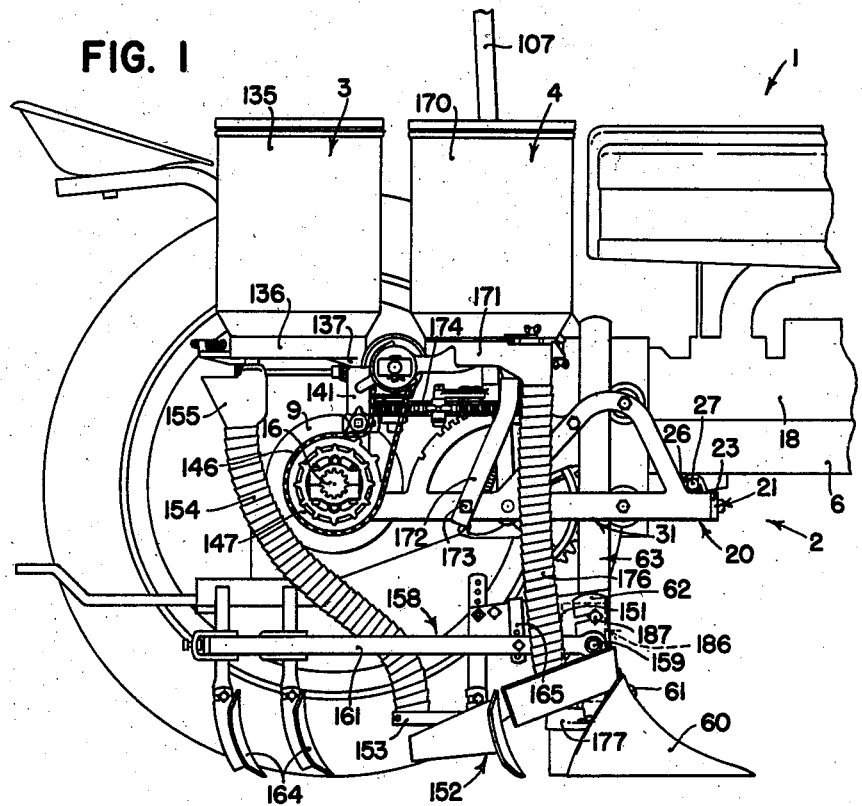
Figure 1 is a side view of an agricultural machine in which the principles of the present invention have been incorporated.

Referring now to the drawings, more particularly to Figures 1 and 2, the present invention is shown as incorporated in an agricultural machine which includes a tractor 1 serving as supporting frame means and a tool carrying implement 2 with which planting and fertilizing units 3 and 4, preferably supported on the tractor 1, are operatively associated.

The tractor 1 is of more or less conventional construction, embodying a frame 6 supported at its forward end on front steering wheels and, at its rear end, connected to or including a rear axle housing 8 (Figure 2) which is provided with laterally outwardly extending axle housing sections 9 (Figure 1) and 10 (Figure 2). As best shown in the latter figure, each rear axle housing extension is provided with tapped attachment lugs 12, 13 and 14 which form convenient means for securing implement parts to the tractor. Axle shafts 16 and 17 are journaled in the axle housing extensions 9 and 10 and are arranged to be driven by the tractor motor 18 in the usual way.

The frame of the implement 2 is indicated in its entirety by the reference numeral 20 and includes a transversely disposed cross bar 21, which is preferably of flat stock and having a length such as when the cross bar 21 is disposed transversely of the tractor it extends laterally outwardly beyond the body of the tractor, as indicated at 23 and 24. The cross bar 21 is fixed to the sides of the tractor frame by a pair of clips 26 formed so that one end of each clip may be bolted, as at 27, to a bracket on the tractor and the other end may be bolted, as at 29, to the cross bar, all as best shown in Figure 2.

A pair of draft frames 31 (Figure 1) and 32 (Figure 2) are connected between the ends 23 and 24 of the cross bar 21 and the rear axle housing extensions 9 and 10. Each draft frame includes a bar 35 (Figure 2) which at its forward end 36 is bent laterally inwardly and at its rear end is bent, as at 37, so as to extend along the associated rear axle housing extension. The rear section 37 is apertured to receive a pair of cap screws 38 and 39 which thread into tapped openings in the attaching bosses 12 and 13. Each frame also includes a second strap member 41 which at its forward end is bent, as at 42, and at its rear end 43 is bent so as to extend laterally outwardly alongside the inner portion of the frame section 37. The end 43 is apertured to receive the cap screw 39, and the laterally inwardly directed end 36 and the laterally outwardly directed end 42 of the strap members 35 and 41 are each apertured to receive bolts 43 and 44 which extend through suitable apertures in the associated end of the cross bar 21. Thus, when the cap screws 38 and 39, and the bolts 43 and 44, are tightened, each draft frame forms a rigid connection between the laterally outer end of the cross bar 21 and the rear axle housing. Welded or otherwise fixed to the draft frame member 35 is an inverted U-shaped bracket 48, and a companion inverted U-shaped bracket 49 is secured as by welding or otherwise to the draft frame member 41. The upper portions of the brackets 48 and 49 are maintained in the desired laterally spaced relation by a spacing bolt 51. This bolt is provided with a shoulder 52 and an adjacent threaded end which extends through an aperture in the bracket 49 and receives a nut by which the bracket 49 may be clamped firmly against the shoulder 52. At its other end the spacing bolt 51 is threaded and extends through an aperture in the outer bracket 48. The outer threaded end of the spacing bolt 51 receives a pair of lock nuts, represented by the nut 53 in Figure 2, one on each side of the bracket 48, whereby the spacing between the brackets 48 and 49 may be adjusted or fixed as desired. The draft frames 31 and 32 are substantially identical, except that certain parts may be right-hand and other parts may be left-hand, and hence the description of one will suffice. Each draft frame includes suitable guiding and adjusting mechanism for the associated tools which will be described below.

The implement frame 20 forms a strong and sturdy support for a variety of tools which may be carried thereby. In order to best illustrate the principles of the present invention. I have shown in the drawings a sweep type cotton and corn planter, in which the ground working tools are sweeps which are mounted on or carried by generally vertically reciprocable tool beams or shanks connected, respectively, with the draft frames 31 and 32, described above, but it will be understood that my invention is not limited to tools or implements of the sweep type.

Figure 6:
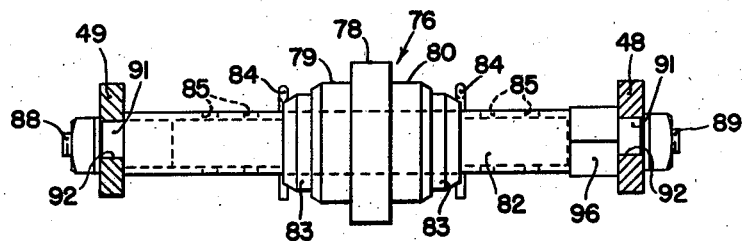
Figure 6 is a section taken generally along the line 6—6 of Figure 2.

At each side of the tractor 1 a ground working tool, such as a sweep 60, is fastened by a bolt 61 or other suitable means to a pair of conventional friction trip plates 62 pivoted to the lower end of a vertically reciprocable tool shank or tool beam 63. As best shown in Figure 2, each tool beam 63 includes a pair of laterally spaced apart bars 64 and 65 disposed on opposite sides of an intermediate bar 66. Heavy rivets 67, or any other suitable means, may be utilized for fixing the bars 64, 65 and 66 together. It will be noted that the inner bar 66 is more narrow than the outer bars 64 and 65 so that each vertically reciprocable tool beam presents forwardly and rearwardly directed edges, as indicated at 71 and 72, respectively, with a groove or channel therebetween, as indicated at 73 and 74. For guiding each tool beam in its generally vertical movements, each draft frame 31 and 32 carries a pair of forward rollers 76. As best shown in Figure 6, each roller 76 includes a central flange 78 and bearing shoulders 79 and 80 on opposite sides thereof. The bearing shoulders 79 and 80 receive the forward edges 71 of the associated tool beam, as best shown in Figure 2. Each roller 76 is journaled for rotation on an eccentrically mounted adjusting shaft 82 and is held in position thereon by a pair of collars 83. The collars are held against rotation by pins 84 disposed in suitable openings 85 in the shaft 82. The flange 78 on each of the two rollers associated with each tool beam seat far enough in the channel or groove 73 of the associated tool beam so that the rollers serve to prevent the tool beam from shifting laterally relative to the associated draft frame. The lateral position of the tool beam may be varied by removing the pins 84 and shifting the rollers and collars to a new position, reinserting the pins 84 in other holes 85. Each tool beam is held up against the associated rollers 76 by means which will be described below.

Each of the shafts 82 associated with each draft frame is eccentrically mounted on the draft frame so as to provide for adjusting the position of the tool beam and taking up any wear or looseness in the parts. The upper shaft 82, as best shown in Figure 6, has outer threaded ends 88 and 89 which are coaxial with respect to the general axis of the shaft 82, and between each threaded end and the main body of the shaft 82 is an eccentric section 91. The two brackets 48 and 49 of the associated draft frame are provided with openings 92 adapted to receive the eccentric sections 91, and nuts 93 are threaded onto the ends 88 and 89 of the shaft 82. The eccentric sections 91 do not extend all the way through the bracket openings 92, whereby when the nuts 93 are tightened the shaft 82 is held firmly and rigidly against rotation. However, the shaft 82 at one end is provided with a squared section 96, and when the nuts 93 are loosened, the shaft 82 may be turned about the axis of the eccentric sections 91, thereby moving the associated roller 76 generally longitudinally in one direction or the other. The lower roller shaft 82 is of substantially the same construction as described above, except that the eccentric sections of the lower shaft 82 are received in suitable openings formed in the draft frame members 35 and 41; otherwise, the construction is substantially identical, and hence a further description is not necessary.

Each of the draft frames 31 and 32 carries means for raising and lowering the associated tool beam 63. According to the present invention, the opposite side bars 35 and 41 of each unit are apertured to receive the rounded end portions 101 and 102 of a shaft 103, the major portion of which is square in cross section. The rounded or cylindrical portions 101 and 102 project slightly beyond the adjacent surfaces of the draft frame members so that when the nuts 104 are tightened to secure the shaft 103 against lateral displacement, the shaft is nevertheless free to rotate in its bearing support. The cylindrical section 101 is of greater axial extent than the companion cylindrical portion 102 so as to receive the inner apertured end of a hand lever 107. The lever 107 carries the usual detent latch which cooperates with a sector 108 that is fixed to the inner draft member 41 and to the inner guide bracket 49. A brace 109 is fixed at its upper end, as by welding or the like, to the lever 107 above the sector 108 and is formed so as to extend laterally outwardly therefrom, as indicated at 110, and then downwardly alongside the lower end of the lever 107, generally in parallelism therewith, as indicated at 112. This portion terminates in an apertured section 113 which embraces the hub portion 114 of an arm 116, preferably in the form of a casting which is mounted on and secured to the square portion of the shaft 103 so as to form a part thereof. The arm 116 has an abutment extension 117 which lies alongside the lower end of the hand lever 107 and is movable relative thereto between stops which are defined by a bracket 119 provided with downturned ends 120 and 121. Preferably, the bracket 119 is welded to the lever 107. The arm 116 also includes a lug 123 disposed at an angle to the extension 117 and at its outer end receives the lower end of a spring 124, the upper end of which is adjustably connected, as by a bolt 125, to the lateral section 110 of the brace 109. The effect of the spring 124 is to hold the arm 116 and hand lever 107 against relative movement, with the extension 117 of the arm 116 normally against the stop 120. Normally, therefore, when the hand lever 107 is moved forwardly, or in a counterclockwise direction as viewed in Figure 3, the spring tension causes the shaft 103 to move through the same angular distance. When the lever 107 is moved in a clockwise direction, the stop 120 engages directly the arm section 117 so that this movement of the hand lever 107 occasions the same movement of the shaft 103.

Figure 5:
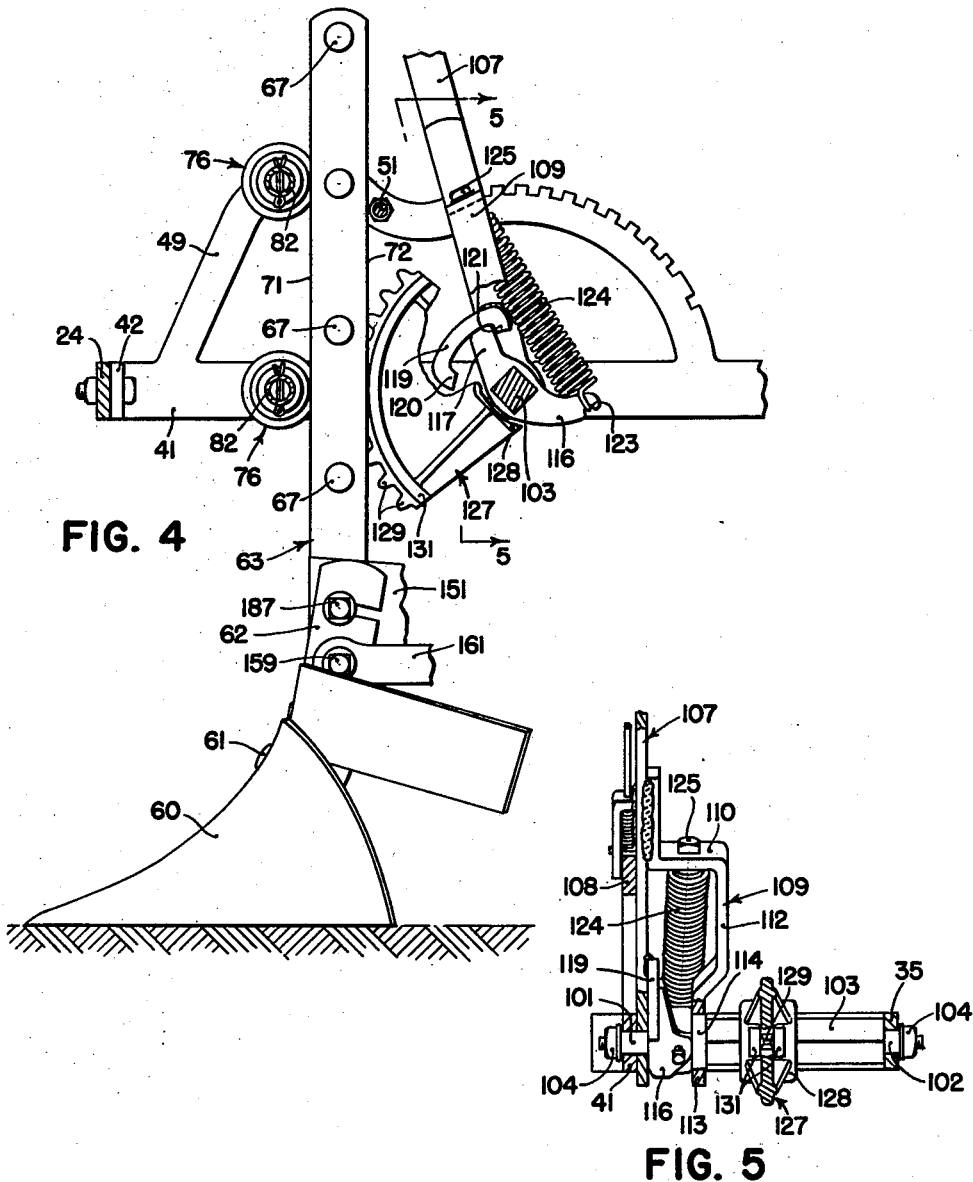
Figure 5 is a section taken generally along the line 5—5 of Figure 4, showing the support of the depth adjusting lever on the sector shaft operating arm.

The latter mentioned movement is made use of to raise the associated tool bar and the counterclockwise movement of the hand lever 107 and shaft 103 (Figure 3) is made use of to lower the tool beam. To this end, a sector casting 127 provided with a square hub 128, is mounted on and clamped firmly to the square shaft 103, and is provided with a set of teeth 129 which are adapted to mesh with teeth 130 formed in the adjacent portion of the rear edge of the intermediate or spacing member 66 of the associated tool beam 63. Also, as best shown in Figure 5, the sector 127 is provided with shoulders 131 on opposite sides of and disposed radially inwardly of the teeth 129. The shoulders 131 are adapted to engage the rear edges 72 of the tool beam members 64 and 65, and from Figures 1 and 3, it will be seen that the sector 127 is disposed substantially directly rearwardly of the lower guide roller 76. As will be readily understood, the eccentric adjusting shaft 82 for the lower guide roller 86 may be readily adjusted to cause the lower roller 76 to bear snugly against the forward edge of the tool beam 63 and to cause the rear edge of the latter to bear snugly against the sector 127, yet have adequate freedom of movement to be raised or lowered by the lever 107, as desired. The spacing bolt 51 serves to hold the upper end of the tool bar against the upper roller 76 against any tendency for the upper end of the tool beam to move away.

Figure 3:
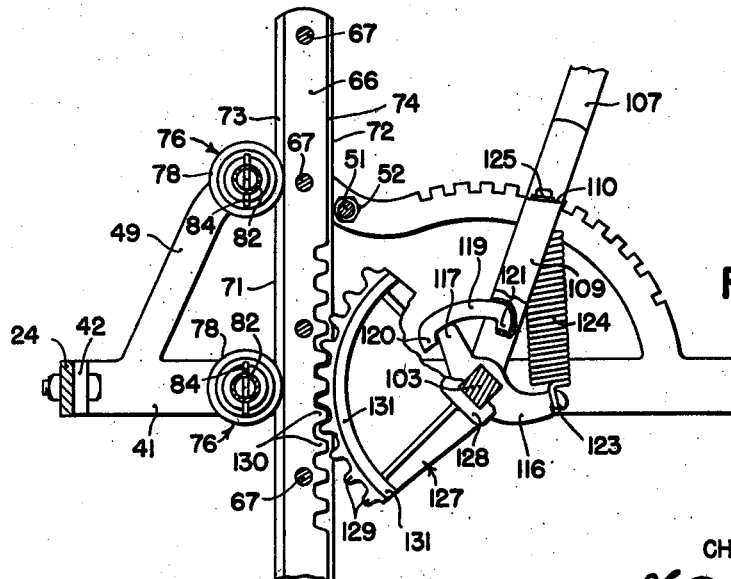
Figure 3 is a sectional view taken generally along the line 3—3 of Figure 2, showing the connections between the hand lever and the sector which raises and lowers the tool beam.
Figure 4:
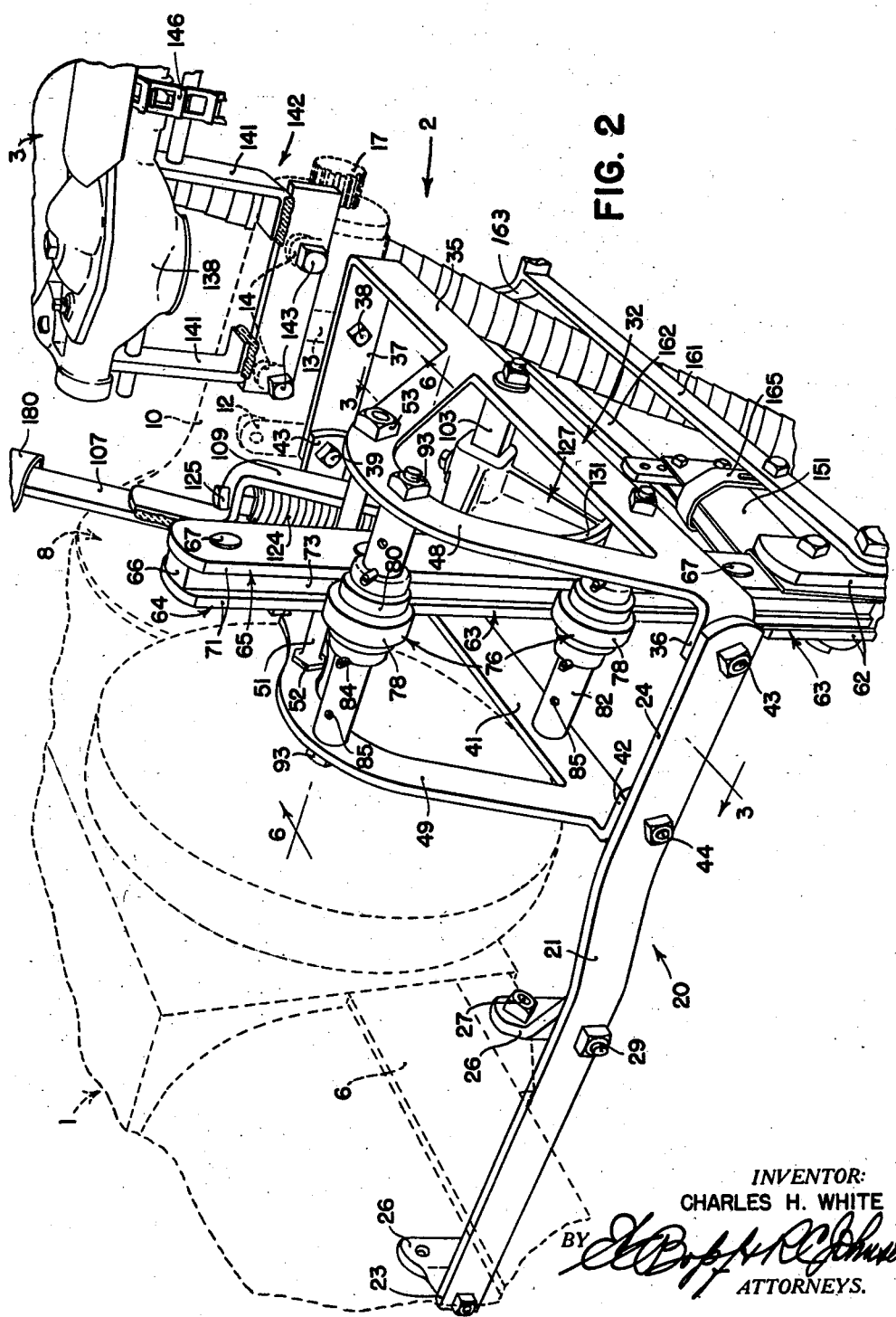
Figure 4 is a view similar to Figure 3 but showing the position of the parts when the hand lever has been moved into an operating position with the machine stationary and the associated ground working tool not yet in its operating position.

Preferably, the parts are so arranged that the hand lever 107 stands in about the position shown in Figure 3 when the sweeps 60 are right at the top surface of the ground. As mentioned above, moving the hand lever 107 rearwardly will raise the associated tool beam into its inoperative position. Moving the hand lever 107 forwardly from the position shown in Figure 3 will force the tool 60 down into the ground, providing the outfit is moving or if the ground is soft enough to permit the tool to be forced directly downwardly. If, however, this is not the case, moving the hand lever 107 forwardly from the position shown in Figure 3 to the position shown in Figure 4 serves only to stretch the spring 124. However, the bias imparted to the spring is exerted continuously against the associated tool beam, with the result that when the outfit does start up or when the stretch of hard ground is passed, the tool 60 will be immediately forced into the ground without further attention on the part of the operator. Thus, the springs 124 serve the very useful purpose of cushioning the tool beams and providing a yielding means for forcing the tools into the ground and permitting them momentarily to rise if it should occur that hard ground is encountered. If there were direct connections between the tool beams and the lifting mechanism, and if a stretch of hard ground or some obstruction to the proper penetration of the tools were encountered, it is not unlikely that some parts might be broken if a yielding cushioning mechanism, such as I have shown and described, is not employed. Thus, in the present implement, the springs 124 serve to protect the teeth 129 and 130 against breakage. Also, the implement may be adjusted for any depth of operation without requiring that the tools be actually forced that far into the ground.

The implement described above is particularly adapted for sweep planters. Accordingly, I prefer to mount on the tractor planting and fertilizing means arranged to deposit seed and fertilizer, and preferably such planting and fertilizing means may be constructed along the lines of the planting and fertilizing means shown in my prior Patent No. 2,210,994, dated August 13, 1940, to which reference may be had if necessary. Briefly, the planting unit at each side of the tractor includes a seed hopper 135 supported on a base or other suitable means, as indicated at 136. The base or support 136 is provided with a pair of arms 137 connected with or forming a part of a gear case 138 which is bolted on the upper laterally inturned ends of a pair of arms 141 which form a part of a bracket 142 secured, as by cap screws 143, to the tractor attaching lugs, as suggested in said prior patent. The planter unit base 136 includes seed selecting and feeding mechanism driven by a chain 146 from a sprocket 147 that is detachably mounted on the adjacent axle shaft 17 (Figure 2). As best shown in Figure 1, the unit 3 at the right side of the tractor is of substantially the same construction and is also driven by a chain 146 carried around a sprocket 147 fixed to the adjacent axle 16.

A pair of plates 151 are fixed at their forward ends to the lower portion of each of the tool beams 63 and extend rearwardly therefrom, forming a bracket to which a planter furrow opener 152 is connected. The furrow opener 152 carries a yoke 153 extending rearwardly therefrom to which the lower end of a seed tube 154 is connected, as best shown in Figure 1, the upper end of the seed tube being connected to a funnel 155 which receives seed from the associated hopper 135 under the control of the seed selecting mechanism associated therewith. A covering shovel frame 158 is pivoted, as at 159, to the lower portion of each of the tool beams 63 and comprises a pair of strap members 161 and 162 extending rearwardly along opposite sides of the seed tube and receiving a cross bar 163 to which covering shovels 164 are fixed. A strap 165 is fixed at its lower ends to the straps 161 and 162 and extends over the upper edge of the plates 151. The yoke 165 serves as a stop limiting the downward swinging movement of the covering frame 158 but permitting upward movement of the covering frame relative to the tool beam 63 and furrow opener 152 associated therewith. Normally, the covering shovel frame 158 floats when the associated tool beam 63 is in its lowered or operating position, but when the tool beam is raised, the covering shovel frame is also raised with it, due to the contact of the yoke 165 with the plates 151.

Figure 7:
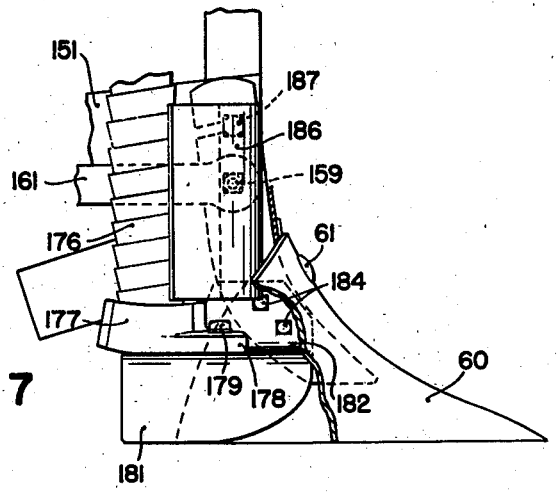
Figure 7 is a fragmentary side view, showing the fertilizer furrow opener and the fertilizer spout shield.

The machine may be operated simply as a planter, with a planting unit 3 at each side thereof, as described above, but frequently the farmer will desire to distribute fertilizer at the same time that he plants, and to this end I provide a fertilizer attachment 4 for each of the planting attachments 3, as suggested in my prior patent identified above. Briefly, each fertilizing unit includes a fertilizer hopper 170 supported on a frame or base 171 which is, in turn, supported on the gear housing section 138 of the planting unit and on a brace 172 which is bolted at its upper end to the fertilizer hopper bottom 171 and at its lower end to the outer member 35 of the associated draft frame, as indicated at 173. The fertilizer distributing mechanism is driven from the seeding mechanism by a chain 174 and associated parts, along the lines of the mechanism shown in said prior patent. A fertilizer feed tube 176 leads downwardly from the fertilizer hopper base and connects at its lower end to a fertilizer boot 177 (Figure 7) in the form of a collar having a forward lug 178 that is apertured and fastened by a bolt 179 to a fertilizer opener 181. The latter member is in the general form of a plate bent, as shown at 182, to receive the boot 177. The upper part of the plate 181 is secured to the lower end of the sweep beam 63 by bolts 184 or the like. To protect each fertilizer tube from trash and dirt coming over the sweep 60, I provide curved shields 186 which are secured by bolts 159 and 187 to the sweep beam 60 generally above the fertilizer furrow opener 181. Preferably, the fertilizer furrow opener 181 is attached to the outside of the lower end of the associated tool beam so as to deposit the fertilizer to one side of and slightly below the seed that subsequently is deposited behind the planter furrow opener 152. It will be noted that both the planter furrow openers 152 and the fertilizer furrow openers 181 are raised and lowered at the same time that the associated tool beams 63 are raised and lowered.

The operation of this machine is believed to be apparent from the above description.

Assuming that the machine is standing at the beginning of the rows to be planted, the operator swings both of the hand levers 107 forwardly, stressing the cushioning springs 124 thereby exerting a bias tending to force both of the sweeps into the ground as soon as the outfit starts up. As will be readily understood, sweep planters are commonly employed where the field has been previously bedded so that at planting time the tools sweep off the tops of the beds and the planting is done on the flat sections immediately behind the sweeps. These ridges or beds sometimes get quite hard, in which case the springs 124 may yield in order to permit the sweeps momentarily to rise above such obstructions, but as soon as softer soil is encountered the springs immediately force the sweeps back to their proper operating level. The planter furrow openers 152 open small furrows in the swept off lands and the seed is deposited therein by the seed selecting mechanism associated with each of the planting units 2. At the same time, the fertilizer is distributed to one side of and above the seed level by the fertilizer furrow openers 181.

During the forward travel of the machine the pressure of the soil against the sweeps 60, which usually are quite wide, is appreciable, but according to the principles of the present invention these forces are adequately sustained by the bearing of the tool beams against the shoulders 131 on the sector 127. The shoulders 131 are arcuate, and hence there is adequate bearing, regardless of depth adjustment. Moreover, the upper roller sustains its portion of the load due to the soil pressure against the lower end of the associated tool beam, yet each tool beam is adapted to have relatively free vertical movement under the control of the associated hand lever 107. The rotatable eccentric shafts 82 may be adjusted, as pointed out above, first, to hold each tool beam against its associated load bearing sector and, in the second place, to position the tool for the desired operation, and to take care of any wear that may occur. When the sweeps are raised to their inoperative position, a small cam 180 on each hand lever 107 serves to disconnect the drive from each axle to its associated planter and fertilizer units. It will be observed that the units at one side are independent of the units at the other, and hence either planting unit may be raised while the other is left in operating position, which is an advantage when finishing up a field or when planting on terraced land when the rows are of different lengths. The particular construction of the implement frame, close to the tractor rear axle, provides a simple compact design which does not interfere with the easy handling of the tractor.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a planter, a movable tool beam, frame means with respect to which said tool beam is generally vertically movable, a planter furrow opener, bracket means connected to the lower portion of said tool beam and extending rearwardly therefrom for securing said planter furrow opener thereto, a floating coverer frame movably connected with said tool beam, stop means carried by said coverer frame and cooperating with said planter furrow opener bracket for limiting the downward movement of the coverer frame relative thereto, and means on said frame means for raising said tool beam, said planter furrow opener and said coverer frame.

2. In an agricultural implement, a draft frame, a generally vertically movable tool beam, and means for guiding the vertical movements of said tool beam in said draft frame, including a roller mounted for rotation on the draft frame and having portions engageable with the tool beam to limit the lateral movement thereof relative to the draft frame.

3. In an agricultural implement, a draft frame, a vertically shiftable tool beam comprising laterally spaced apart plates, and means for guiding said tool beam in said draft frame, including a pair of rollers engageable with the tool beam and having portions extending between the plates whereby said rollers serve to limit lateral movement of the tool beam relative to the draft frame.

4. In an agricultural implement, a draft frame, a vertically shiftable tool beam comprising laterally spaced apart plates, means serving as a pair of shafts supported by said draft frame, a roller mounted on each shaft, each roller having a flange section adapted to be disposed between said tool beam plates, means for holding said tool beam against said rollers, and means adjustably positioning said rollers on said shafts, the engagement of the roller flanges between said tool beam plates limiting lateral movement of said tool beam.

5. The invention defined in claim 4, further characterized by a spacing bar disposed between the spaced apart plates of said tool beam, said spacing bar having teeth, and means for raising and lowering said tool beam comprising a toothed sector swingably mounted on said draft frame means and having teeth engageable with the teeth of said spacing member.

6. In an agricultural implement, means serving as a draft frame, a generally vertically reciprocable tool beam carried thereby and comprising a pair of laterally spaced plates and a spacing bar therebetween, the latter having teeth, said spacing bar being narrower than said plates whereby the forward and rear edges of the latter overhang the spacing bar, means for guiding said tool beam comprising a plurality of rollers, each having a flange adapted to lie between the forward edges of said tool beam plates and shoulders with which said forward edges are adapted to engage, and means for raising and lowering said tool beam, comprising a sector swingably mounted on said draft frame means and having teeth engageable with the teeth of said spacing member, said sector having shoulders engageable with the rear edges of said tool beam plates and cooperating with said rollers for holding said tool beam against displacement.

7. The combination with a tractor of an agricultural implement comprising a cross bar adapted to be secured to the tractor transversely thereof and forward of the rear axle housing of the tractor, a pair of draft frames, each secured at its forward portion to the outer end of the cross bar and at its rear portion to the rear axle housing at that side of the tractor, a tool beam mounted for generally vertical shifting movement in the forward portion of each draft frame, a rearwardly extending bracket fixed at its forward end to the lower portion of each tool beam, a planter furrow opener connected to each bracket, a floating coverer frame movably connected with said tool beam, stop means carried by said coverer frame and cooperating with said planter furrow opener bracket for limiting the downward movement of the coverer frame relative thereto, a pair of seed selecting mechanisms, a pair of brackets supporting said seeding mechanisms, respectively, on said rear axle housing, one at each side of the tractor, a seed tube leading downwardly from each seed selecting mechanism to the associated planter furrow opener, a pair of fertilizer distributing mechanisms, means supporting said mechanisms, respectively, on said seed selecting mechanisms, a fertilizer furrow opener carried at the lower end of each of said tool beams, and a fertilizer tube leading downwardly from each fertilizer distributing mechanism to the associated fertilizer furrow opener.

8. An agricultural implement comprising the combination with a tractor having a rear axle housing including laterally outwardly extending housing sections, of a cross bar fixed to the tractor transversely thereof and forward of said rear axle housing, a pair of frames fixed at their rear ends to said rear axle housing extensions, respectively, and fixed at their forward ends to the outer ends, respectively, of said cross bar, a generally vertically movable tool carrying member movably connected with each of said frames, a planter furrow opener and a fertilizer furrow opener fixed to each of said tool carrying members, a floating coverer frame pivotally connected to said tool carrying member for vertical swinging movement relative thereto, stop means carried by said coverer frame and cooperating with stop means carried on one of said furrow openers for limiting the downward movement of the coverer frame relative thereto, a pair of seeding units and a pair of fertilizer distributing units supported by the tractor generally above said frames, and seed tubes leading downwardly from said planting and fertilizer distributing units to the associated planter and fertilizer furrow openers.

9. In an agricultural implement, means serving as a frame, a generally vertically reciprocable tool beam, and means serving as a pair of guide members mounted for movement at opposite edges of said tool beam about axes spaced on opposite sides of said tool beam and eccentrically mounted means supporting one of said members and adjustable relative to the other to position the tool beam therebetween.

10. In an agricultural implement, means serving as a frame, a generally vertically reciprocable tool beam, a sector pivotally mounted on said frame and engageable with one edge of said tool beam, a pair of rollers engaging the opposite edge of said tool beam, shaft means upon which said rollers are mounted for movement, and eccentric means mounting each of said shafts on said frame means, one of said rollers being disposed generally opposite said sector and the adjustment of the associated shaft serving to hold the tool beam in engagement with said sector, the adjustment of the shaft for the other roller serving to change the position of said tool beam, 11. In a planter, a movable tool beam, frame means with respect to which said tool beam is generally vertically movable, a planter furrow opener, bracket means connected to the lower portion of said tool beam and extending rearwardly therefrom for securing said planter furrow opener thereto, a floating coverer frame pivotally connected with the lower end of said tool beam, cooperating stop means on said coverer frame and said planter furrow opener bracket for limiting the downward movement of the coverer frame relative thereto, and means on said frame means for raising said tool beam, planter furrow opener and coverer frame.

12. In an agricultural implement, a draft frame including a pair of laterally spaced members, a generally vertically movable tool beam disposed therebetween, laterally extending parts connecting said members, rockable members supported on said parts and having interengaging relation with said tool beam whereby vertical movement of the latter is accommodated but lateral movement of the tool beam is limited, and means connecting said rockable members with said parts in different positions of lateral adjustment, whereby the lateral position of said tool beam may be varied.

CHARLES H. WHITE.